US012661642B2

(12) United States Patent
Zhao et al.

(10) Patent No.: US 12,661,642 B2
(45) Date of Patent: Jun. 23, 2026

(54) MOFS/COFS HETEROJUNCTION COMPOSITE PHOTOCATALYST AND PREPARATION METHOD AND APPLICATION THEREOF

(71) Applicant: GUANGDONG INSTITUTE OF ECO-ENVIRONMENT AND SOIL SCIENCES, Guangzhou (CN)

(72) Inventors: Xiaoli Zhao, Beijing (CN); Lin Niu, Beijing (CN); Fengchang Wu, Beijing (CN)

(73) Assignee: GUANGDONG INSTITUTE OF ECO-ENVIRONMENT AND SOIL SCIENCES, Guangzhou (CN)

( * ) Notice: Subject to any disclaimer, the term of this patent is extended or adjusted under 35 U.S.C. 154(b) by 517 days.

(21) Appl. No.: 18/135,118

(22) Filed: Apr. 14, 2023

(65) Prior Publication Data

US 2023/0249168 A1      Aug. 10, 2023

Related U.S. Application Data

(63) Continuation of application No. PCT/CN2022/102130, filed on Jun. 29, 2022.

(30) Foreign Application Priority Data

Jun. 29, 2021      (CN) .......................... 202110728280.8

(51) Int. Cl.
| | |
|---|---|
| *B01J 31/16* | (2006.01) |
| *B01J 35/39* | (2024.01) |
| *B01J 37/00* | (2006.01) |
| *B01J 37/04* | (2006.01) |
| *C02F 1/30* | (2023.01) |
| *C02F 1/72* | (2023.01) |
| *C02F 101/34* | (2006.01) |
| *C02F 101/38* | (2006.01) |
| *C07F 15/02* | (2006.01) |

(52) U.S. Cl.
CPC ........... *B01J 31/1691* (2013.01); *B01J 35/39* (2024.01); *B01J 37/0036* (2013.01); *B01J 37/04* (2013.01); *C07F 15/025* (2013.01); *B01J 2531/004* (2013.01); *B01J 2531/842*

(2013.01); *C02F 1/30* (2013.01); *C02F 1/725* (2013.01); *C02F 2101/34* (2013.01); *C02F 2101/38* (2013.01); *C02F 2305/10* (2013.01)

(58) Field of Classification Search
CPC .......... B01J 2531/004; B01J 2531/0216; B01J 2531/842; B01J 31/1691; B01J 31/2239; B01J 31/2243; B01J 35/39; C07F 15/025
See application file for complete search history.

(56) References Cited

U.S. PATENT DOCUMENTS 10,335,765 B2 *  7/2019  Shim .................. G01N 33/0036

FOREIGN PATENT DOCUMENTS

| | | |
|---|---|---|
| CN | 104014352 A | 9/2014 |
| CN | 106975498 A | 7/2017 |
| CN | 109232588 A | 1/2019 |
| CN | 111682208 A | 9/2020 |

OTHER PUBLICATIONS

Zhiguang Zhang et al., Hexagonal microspindle of NH2-MIL-101(Fe) metal-organic frameworks with visible-lightinduced photocatalytic activity for the degradation of toluene, RSC Advances, Dec. 22, 2015, pp. 4289-4295, vol. 6, The Royal Society of Chemistry.

* cited by examiner

*Primary Examiner* — Pancham Bakshi

(57)      ABSTRACT

The application belongs to the technical field of photocatalyst preparation, and specifically relates to a MOFs/COFs heterojunction composite photocatalyst and a preparation method and application thereof. The application uses melamine (MA), 1,3,5-trimethylphloroglucinol (Tp), 2-aminoterephthalic acid, and ferrous acetate as reaction raw materials, a catalyst is added, and a mechanical grinding method is used, to prepare the MOFs/COFs heterojunction composite photocatalyst. The catalyst is simple and green in preparation method, and has the better degradation efficiency for pollutants in water, especially carbamazepine.

7 Claims, No Drawings

MOFS/COFS HETEROJUNCTION COMPOSITE PHOTOCATALYST AND PREPARATION METHOD AND APPLICATION THEREOF

CROSS-REFERENCE TO RELATED APPLICATIONS

The present application is a continuation application of PCT application No. PCT/CN2022/102130 filed on Jun. 29, 2022, which claims the benefit of Chinese Patent Application No. 202110728280.8 filed on Jun. 29, 2021. The contents of all of the aforementioned applications are incorporated by reference herein in their entirety.

TECHNICAL FIELD

The application belongs to the technical field of photocatalyst preparation, and specifically relates to a MOFs/COFs heterojunction composite photocatalyst and a preparation method and application thereof.

BACKGROUND

With the development of industrialization and urbanization process, the continuous abuse of antibiotics leads to chronic toxicological effects produced by microorganisms in the aquatic environment. At the same time, the microbial resistance to the antibiotics is increased, and a potential threat is caused to the ecosystem. In particular, there is a recent research that a trace (μg) level of a carbamazepine pollutant is detected in the aquatic ecosystem. As an anti-epileptic and analgesic drug, the carbamazepine may cause serious physical discomfort such as nausea and lethargy at lower doses. Due to the persistence and bioaccumulation of the carbamazepine, extensive exposure to the carbamazepine (>40 mg/L) may lead to epilepsy, coma, and even death. Therefore, how to efficiently remove the carbamazepine from the aquatic environment is a current challenge.

In recent years, low-cost and efficient photocatalytic technologies attract extensive attentions in the field of environmental protection and pollutant treatment. Traditional photocatalysts such as $TiO_2$ and ZnO have the best degradation effects on organic pollutants under ultraviolet light. However, with the development of science and technology, photocatalysts driven by visible light are continuously developed. Compared to the traditional photocatalysts, the wider light absorption range promotes the generation of active species, thereby the photocatalytic activity is improved.

Therefore, the research and development of the photocatalysts driven by the visible light are of great significance for pollutant degradation and environmental remediation. Some methods for photocatalytic degradation of the carbamazepine are already disclosed in existing technologies. For example, a Chinese patent application CN106975498A discloses a preparation method for a near-infrared photocatalyst BiOCl or BiOBr. Equimolar amounts of $Bi(NO_3)_3 \cdot 5H_2O$ and KCl or KBr are respectively dissolved in a certain amount of ethylene glycol solution, and after being stirred and mixed uniformly at a room temperature, it is transferred to a high-pressure reaction kettle with a polytetrafluoroethylene liner, and the filling volume of the reaction kettle is 80%. The reaction kettle is placed in an electrically heated thermostatic oven and heated, and after being reacted at 160° C. for 12 hours, it is taken out and naturally cooled to the room temperature. A precipitate obtained is respectively washed for three times with anhydrous ethanol and distilled water, and then it is dried in air at 50° C., to obtain the BiOCl or BiOBr photocatalyst containing a large amount of oxygen vacancies.

A Chinese patent application CN104014352A discloses a multi-element controllable synthesis method for a BiOCl photocatalyst. The appropriate concentration of $BiCl_3$ is added to diethylene glycol or mixed solvent of diethylene glycol and water, and then a urea precipitator is added. After being mixed uniformly, a sol is directly transferred to a Teflon high-pressure reaction kettle or transferred to the Teflon high-pressure reaction kettle after being subjected to ultrasonic pretreatment, a solvothermal reaction is performed at a certain temperature to generate a precipitate, and the precipitate is washed with water and ethanol, and then dried at 80° C. to obtain BiOCl photocatalyst powder with different morphologies. The catalyst is used for photocatalytic degradation of carbamazepine pharmaceutical wastewater, and shows the better photocatalytic activity than $TiO_2(P25)$ under both ultraviolet and simulated sunlight.

Although the above photocatalysts all achieve the better degradation effects on the carbamazepine, due to the use of a large number of reagents in the catalyst preparation process, and the relatively complex and time-consuming preparation process, as well as the consumption of a large number of solvents, the preparation process also adds to the environmental burden.

The application aims to provide a simple and green photocatalyst preparation method, which has the better degradation efficiency for pollutants in water, especially the carbamazepine, and promotes the environmental remediation and protection.

SUMMARY

In order to overcome the above technical problems, the application provides a MOFs/COFs (metal organic framework/covalent organic framework compound) heterojunction composite photocatalyst and a preparation method and application thereof. The catalyst is simple and green in preparation method, and has the better degradation efficiency for pollutants in water, especially carbamazepine.

In order to achieve the above purpose, technical schemes provided by the application are as follows.

A preparation method for a MOFs/COFs heterojunction composite photocatalyst, including the following steps.

Melamine (MA), 1,3,5-trimethylphloroglucinol (Tp), 2-aminoterephthalic acid, and ferrous acetate are used as reaction raw materials, a catalyst is added, and a mechanical grinding method is used, to prepare the MOFs/COFs heterojunction composite photocatalyst.

Preferably, the preparation method for the MOFs/COFs heterojunction composite photocatalyst includes the following steps.

(1) MA, 2-aminoterephthalic acid, and catalyst are taken and added to a grinding tank for mixing and grinding.

(2) TP and ferrous acetate are then added to the grinding tank, and it is ground continuously.

(3) Ultra pure water is added to the grinding tank, and it is ground continuously, washed with dimethyl formamide (DMF), and vacuum-dried, to obtain the MOFs/COFs heterojunction composite photocatalyst.

Preferably, the catalyst is a p-toluenesulfonic acid.

Preferably, the catalyst is the p-toluenesulfonic acid or acetic acid solution (acetic acid as a solvent) of the p-toluenesulfonic acid, and in the acetic acid solution of the p-toluenesulfonic acid, the mass fraction of the p-toluenesulfonic acid is 12 wt %.

Preferably, the molar ratio of the p-toluenesulfonic acid to MA is 1:3-4.

Preferably, the molar ratio of MA, Tp, 2-aminoterephthalic acid, and ferrous acetate is 3-6:2-6:2:4:1-6.

Preferably, in the grinding process, it is necessary to add a grinding ball, and the diameter of the grinding ball is 5 mm or 7 mm.

Preferably, the grinding ball is a mixture of grinding balls with sizes of 5 mm and 7 mm.

Preferably, in the step (1), the time of the grinding is 30-60 min, preferably 30 min.

Preferably, in the step (1), the rotational speed of the grinding is 300-600 rpm, preferably 300 rpm.

Preferably, in the step (2), the time of the grinding is 3-5 h, preferably 3 h.

Preferably, in the step (3), the time of the grinding is 3-5 h, preferably 5 h.

Another purpose of the application is to provide a MOFs/COFs heterojunction composite photocatalyst prepared by the preparation method for the MOFs/COFs heterojunction composite photocatalyst.

The purpose of the application is further to provide an application of the MOFs/COFs heterojunction composite photocatalyst in degradation of an organic pollutant in water.

Preferably, the organic pollutant in the water is carbamazepine.

Compared to existing technologies, the technical advantages of the application are as follows.

(1) The MOFs/COFs heterojunction composite photocatalyst provided by the application has the better organic degradation effects, especially the degradation of the carbamazepine. At the same time, the preparation method for the MOFs/COFs heterojunction composite photocatalyst provided by the application overcomes time-consuming and laborious problems of traditional preparation methods, and the preparation method is more environment-friendly, simple, and efficient.

(2) The photocatalyst provided by the application is a Z-type MOFs/COFs heterojunction composite photocatalyst, and it greatly improves the light absorption range, achieves rapid response under visible light, and improves the ability of photocatalytic degradation of the pollutants.

(3) The photocatalyst provided by the application overcomes the technical defects of a single COFs or MOFs catalyst such as low electron-hole separation rate, low visible light absorption range, low catalytic activity, and limited degradation effects.

DETAILED DESCRIPTION OF THE EMBODIMENTS

The application is described below by specific embodiments, so that the technical schemes of the application are more easily understood and mastered, but the application is not limited to this. Experimental methods described in the following embodiments are all conventional methods unless otherwise specified; and reagents and materials described may be obtained commercially unless otherwise specified.

A p-toluenesulfonic acid catalyst used in embodiments and contrast examples of the application is acetic acid solution containing 12 wt % p-toluenesulfonic acid.

Embodiment 1

A preparation method for a MOFs/COFs heterojunction composite photocatalyst includes the following steps:

1) 10 grinding balls with a diameter of 5 mm and 25 grinding balls with a diameter of 7 mm are added to a 50 mL zirconia grinding tank, 1 mL of a p-toluenesulfonic acid catalyst, 340 mg of MA, and 960 mg of a 2-aminoterephthalic acid are added to the grinding tank, and the rotational speed is set to 300 rpm; and it is ground for 30 min.

2) 378 mg of TP and 622 mg of ferrous acetate are added to the grinding tank, and it is ground continuously for 3 h by using the kinetic energy between the grinding balls and the grinding tank.

3) 1 mL of ultra pure water is placed in a mixture of the grinding tank, and it is ground continuously for 5 h; and finally, the MOFs/COFs heterojunction composite photocatalyst is collected, washed with DMF for 3 times, and vacuum-dried at 60° C.

Embodiment 2

A preparation method for a MOFs/COFs heterojunction composite photocatalyst includes the following steps.

1) 10 grinding balls with a diameter of 5 mm and 25 grinding balls with a diameter of 7 mm are added to a 50 mL zirconia grinding tank, 1 mL of a p-toluenesulfonic acid catalyst, 340 mg of MA, and 480 mg of a 2-aminoterephthalic acid are added to the grinding tank, and the rotational speed is set to 300 rpm; and it is ground for 60 min.

2) 378 mg of TP and 311 mg of ferrous acetate are added to the grinding tank, and it is ground continuously for 3 h by using the kinetic energy between the grinding balls and the grinding tank.

3) 1 mL of ultra pure water is placed in a mixture of the grinding tank, and it is ground continuously for 5 h; and finally, the MOFs/COFs heterojunction composite photocatalyst is collected, washed with DMF for 2 times, and vacuum-dried at 60° C.

Embodiment 3

A preparation method for a MOFs/COFs heterojunction composite photocatalyst includes the following steps.

1) 10 grinding balls with a diameter of 5 mm and 25 grinding balls with a diameter of 7 mm are added to a 50 mL zirconia grinding tank, 1 mL of a p-toluenesulfonic acid catalyst, 340 mg of MA, and 1440 mg of a 2-aminoterephthalic acid are added to the grinding tank, and the rotational speed is set to 300 rpm; and it is ground for 30 min.

2) 378 mg of TP and 933 mg of ferrous acetate are added to the grinding tank, and it is ground continuously for 5 h by using the kinetic energy between the grinding balls and the grinding tank.

3) 1 mL of ultra pure water is placed in a mixture of the grinding tank, and it is ground continuously for 3 h; and finally, the MOFs/COFs heterojunction composite photocatalyst is collected, washed with DMF for 3 times, and vacuum-dried at 60° C.

Embodiment 4

A preparation method for a MOFs/COFs heterojunction composite photocatalyst includes the following steps.

1) 10 grinding balls with a diameter of 5 mm and 25 grinding balls with a diameter of 7 mm are added to a 50 mL zirconia grinding tank, 1 mL of a p-toluenesulfonic acid catalyst, 340 mg of MA, and 240 mg of a 2-aminoterephthalic acid are added to the grinding tank, and the rotational speed is set to 300 rpm; and it is ground for 30 min.

2) 378 mg of TP and 155.5 mg of ferrous acetate are added to the grinding tank, and it is ground continuously for 4 h by using the kinetic energy between the grinding balls and the grinding tank.

3) 1 mL of ultra pure water is placed in a mixture of the grinding tank, and it is ground continuously for 4 h; and finally, the MOFs/COFs heterojunction composite photocatalyst is collected, washed with DMF for 3 times, and vacuum-dried at 60° C.

Embodiment 5

A preparation method for a MOFs/COFs heterojunction composite photocatalyst includes the following steps.

1) 10 grinding balls with a diameter of 5 mm and 25 grinding balls with a diameter of 7 mm are added to a 50 mL zirconia grinding tank, 1 mL of a p-toluene-sulfonic acid catalyst, 340 mg of MA, and 160 mg of a 2-aminoterephthalic acid are added to the grinding tank, and the rotational speed is set to 300 rpm; and it is ground for 30 min.

2) 378 mg of TP and 103.7 mg of ferrous acetate are added to the grinding tank, and it is ground continuously for 3 h by using the kinetic energy between the grinding balls and the grinding tank.

3) 1 mL of ultra pure water is placed in a mixture of the grinding tank, and it is ground continuously for 5 h; and finally, the MOFs/COFs heterojunction composite photocatalyst is collected, washed with DMF for 3 times, and vacuum-dried at 60° C.

Contrast Example 1

Compared to Embodiment 1, the difference is only that there is no catalyst.

A preparation method for a MOFs/COFs heterojunction composite photocatalyst includes the following steps.

1) 10 grinding balls with a diameter of 5 mm and 25 grinding balls with a diameter of 7 mm are added to a 50 mL zirconia grinding tank, 340 mg of MA and 960 mg of a 2-aminoterephthalic acid are added to the grinding tank, and the rotational speed is set to 300 rpm; and it is ground for 30 min.

2) 378 mg of TP and 622 mg of ferrous acetate are added to the grinding tank, and it is ground continuously for 3 h by using the kinetic energy between the grinding balls and the grinding tank.

3) 1 mL of ultra pure water is placed in a mixture of the grinding tank, and it is ground continuously for 5 h; and finally, the MOFs/COFs heterojunction composite photocatalyst is collected, washed with DMF for 3 times, and vacuum-dried at 60° C.

Contrast Example 2

Compared to Embodiment 1, the difference is only that the types of catalysts are different.

A preparation method for a MOFs/COFs heterojunction composite photocatalyst includes the following steps.

1) 10 grinding balls with a diameter of 5 mm and 25 grinding balls with a diameter of 7 mm are added to a 50 mL zirconia grinding tank, 1 mL of acetonitrile as a catalyst, 340 mg of MA, and 960 mg of a 2-aminoterephthalic acid are added to the grinding tank, and the rotational speed is set to 300 rpm; and it is ground for 30 min.

2) 378 mg of TP and 622 mg of ferrous acetate are added to the grinding tank, and it is ground continuously for 3 h by using the kinetic energy between the grinding balls and the grinding tank.

3) 1 mL of ultra pure water is placed in a mixture of the grinding tank, and it is ground continuously for 5 h; and finally, the MOFs/COFs heterojunction composite photocatalyst is collected, washed with DMF for 3 times, and vacuum-dried at 60° C.

Contrast Example 3

Compared to Embodiment 1, the difference is only that the types of iron sources are different.

A preparation method for a MOFs/COFs heterojunction composite photocatalyst includes the following steps.

1) 10 grinding balls with a diameter of 5 mm and 25 grinding balls with a diameter of 7 mm are added to a 50 mL zirconia grinding tank, 1 mL of a p-toluene-sulfonic acid catalyst, 340 mg of MA, and 960 mg of a 2-aminoterephthalic acid are added to the grinding tank, and the rotational speed is set to 300 rpm; and it is ground for 30 min.

2) 378 mg of TP and 643.2 mg of ferrous nitrate are added to the grinding tank, and it is ground continuously for 3 h by using the kinetic energy between the grinding balls and the grinding tank.

3) 1 mL of ultra pure water is placed in a mixture of the grinding tank, and it is ground continuously for 5 h; and finally, the MOFs/COFs heterojunction composite photocatalyst is collected, washed with DMF for 3 times, and vacuum-dried at 60° C.

Contrast Example 4

Compared to Embodiment 1, the difference is that only COFs catalyst is prepared.

A preparation method for a COFs catalyst includes the following steps.

1) 10 grinding balls with a diameter of 5 mm and 25 grinding balls with a diameter of 7 mm are added to a 50 mL zirconia grinding tank, 1 mL of a p-toluene-sulfonic acid catalyst and 340 mg of MA are added to the grinding tank, and the rotational speed is set to 300 rpm; and it is ground for 30 min.

2) 378 mg of TP is added to the grinding tank, and it is ground continuously for 3 h by using the kinetic energy between the grinding balls and the grinding tank.

3) 1 mL of ultra pure water is placed in a mixture of the grinding tank, and it is ground continuously for 5 h; and finally, the COFs catalyst is collected, washed with DMF for 3 times, and vacuum-dried at 60° C.

Contrast Example 5

Compared to Embodiment 1, the difference is that only MOFs catalyst is prepared.

A preparation method for a MOFs catalyst includes the following steps.

1) 10 grinding balls with a diameter of 5 mm and 25 grinding balls with a diameter of 7 mm are added to a 50 mL zirconia grinding tank, 1 mL of a p-toluene-sulfonic acid catalyst and 960 mg of a 2-aminoterephthalic acid are added to the grinding tank, and the rotational speed is set to 300 rpm; and it is ground for 30 min.

2) 622 mg of ferrous acetate is added to the grinding tank, and it is ground continuously for 3 h by using the kinetic energy between the grinding balls and the grinding tank.

3) 1 mL of ultra pure water is placed in a mixture of the grinding tank, and it is ground continuously for 5 h; and finally, the MOFs catalyst is collected, washed with DMF for 3 times, and vacuum-dried at 60° C.

Contrast Example 6

Compared to Embodiment 1, the difference is that a solvothermal method is used to prepare a MOFs/COFs composite catalyst.

A preparation method for a MOFs/COFs composite catalyst includes the following steps.

1) 340 mg of MA and 378 mg of Tp are taken and placed in 11 mL of mixed solution containing mesitylene/1,4-dioxane/acetic acid (the volume ratio is 5:5:5:1), the mixed solution is subjected to ultrasound for 15 min, nitrogen bubbling is performed for 15 min, and then it is transferred to a high-pressure reaction kettle, it is kept at 120° C. for 3 d, and after being cooled to a room temperature, it is washed with acetone, tetrahydrofuran, and hot water for 3 times, and vacuum-dried for standby, to obtain a COFs catalyst.

2) The prepared COFs catalyst, 622 mg of ferrous acetate, and 960 mg of a 2-aminoterephthalic acid are dissolved in 30 mL of DMF, and then a mixture is transferred to a high-pressure kettle lined with teflon, and it is kept at 110° C. for 20 h, and after being cooled to the room temperature, it is washed with anhydrous ethanol, and vacuum-dried at 60° C. for 12 h, to obtain the S-MOFs/COFs composite catalyst.

Effect Evaluation

Catalytic effect evaluation method: carbamazepine is used as a pollutant, and the catalytic performance of the MOFs/COFs composite catalyst is measured. The specific operations are as follows: 25 mg of the MOFs/COFs composite catalyst is taken and placed in 50 mL of 20 m/L carbamazepine solution, to achieve the adsorption-desorption equilibrium under dark conditions. Subsequently, a visible light source (λ>420 nm, 300 W) is turned on, 2 mL of solution is taken at a given time interval (40 min), it passes through 0.22 μm of a filter membrane, and then a high performance liquid chromatography is used to measure its concentration, and the removal rate of pollutants is calculated. According to this method, the catalytic effects of the catalysts prepared in Embodiments 1-5 and Contrast examples 1-6 are evaluated.

Results are shown blow in Table 1:

TABLE 1

Carbamazepine removal rate %

| Test group | Carbamazepine removal rate % | Time/min |
|---|---|---|
| Embodiment 1 | 100.0 | 40 |
| Embodiment 2 | 99.4 | 40 |
| Embodiment 3 | 99.8 | 40 |
| Embodiment 4 | 99.5 | 40 |
| Embodiment 5 | 99.2 | 40 |
| Contrast example 1 | 76.3 | 40 |

TABLE 1-continued

Carbamazepine removal rate %

| Test group | Carbamazepine removal rate % | Time/min |
|---|---|---|
| Contrast example 2 | 79.6 | 40 |
| Contrast example 3 | 82.5 | 40 |
| Contrast example 4 | 31.1 | 40 |
| Contrast example 5 | 24.3 | 40 |
| Contrast example 6 | 95.0 | 40 |

The catalytic results show that: under the dark conditions, after 3 catalysts (COF, MOF, MOFs/COFs) are respectively added, the concentration of carbamazepine is not any changed, it is indicated that the 3 catalysts do not have the adsorption effect on the carbamazepine. The carbamazepine undergoes a small amount of degradation under given light conditions, and the degradation rate is 10% within 40 min. Under visible light irradiation, while COF and MOF are added separately, the removal rates of the carbamazepine are 31.1% and 24.3% at 40 min, respectively, and the removal rate is limited. While the MOFs/COFs composite catalyst is added, the concentration of carbamazepine is decreased rapidly, and 99.2-100% of the carbamazepine may be degraded within 40 min. Compared with the single COF catalyst and MOF catalyst, the catalytic activity of the MOFs/COFs composite catalyst is increased by 3.2 and 4.1 times, respectively, it is indicated that the MOFs/COFs catalyst forms a heterojunction structure, expands the light absorption range, and improves the photocatalytic activity.

In addition, the degradation rate of the S-MOFs/COFs catalyst prepared by the solvothermal method for the carbamazepine is 95.0% within 40 min, it is lower than that of the MOFs/COFs catalyst prepared by a mechanochemical method for the carbamazepine, and it shows the advantages of preparing the MOFs/COFs heterojunction composite photocatalyst by the mechanochemical method.

Within a certain range, under the visible light irradiation, the degradation rates of the MOFs/COFs composite catalysts prepared under different raw material ratios and preparation conditions in Embodiment 1-5 for the carbamazepine are 100.0%, 99.4%, 99.8%, 99.5%, and 99.2%, respectively, and it is indicated that the MOFs/COFs composite photocatalyst prepared under the raw material ratio and conditions in Embodiment 1 has the highest photocatalytic performance.

The above detailed description is a specific description of one of the feasible embodiments of the application, and this embodiment is not intended to limit the patent scope of the application. Any equivalent implementations or modifications that do not depart from the application shall be included in the scope of the technical schemes of the application.

What is claimed is:

1. A preparation method for an MOFs/COFs heterojunction composite photocatalyst, comprising the following steps:

using melamine (MA), 1,3,5-trimethylphloroglucinol (Tp), 2-aminoterephthalic acid, and ferrous acetate as reaction raw materials, adding a catalyst, and preparing the MOFs/COFs heterojunction composite photocatalyst by using a mechanical grinding method, wherein the catalyst is p-toluenesulfonic acid.

2. The preparation method for the MOFs/COFs heterojunction composite photocatalyst as claimed in claim 1, wherein the preparation method comprises the following steps:

(1) taking and adding MA, 2-aminoterephthalic acid, and the catalyst to a grinding tank for mixing and grinding;

(2) then adding Tp and ferrous acetate to the grinding tank, and grinding continuously; and (3) adding water to the grinding tank, and grinding continuously, washing with dimethyl formamide (DMF), and vacuum-drying, to obtain the MOFs/COFs heterojunction composite photocatalyst.

3. The preparation method for the MOFs/COFs heterojunction composite photocatalyst as claimed in claim 2, wherein the catalyst is a solution of the p-toluenesulfonic acid in acetic acid, and in the solution of the p-toluenesulfonic acid in acetic acid, a mass fraction of the p-toluenesulfonic acid is 12 wt %.

4. The preparation method for the MOFs/COFs heterojunction composite photocatalyst as claimed in claim 2, wherein during the grinding in steps (1) to (3), grinding balls are used, and the grinding balls each having a diameter of 5 mm or 7 mm.

5. The preparation method for the MOFs/COFs heterojunction composite photocatalyst as claimed in claim 2, wherein during the grinding in steps (1) to (3), grinding balls are used, and the grinding balls represent a mixture of grinding balls with a size of 5 mm and grinding balls with a size of 7 mm.

6. The preparation method for the MOFs/COFs heterojunction composite photocatalyst as claimed in claim 2, wherein in step (1), a grinding time is in a range of 30-60 minutes; and a rotational speed for the grinding is in a range of 300-600 rpm.

7. The preparation method for the MOFs/COFs heterojunction composite photocatalyst as claimed in claim 2, wherein in step (2), a grinding time is in a range of 3-5 hours; and in step (3), a grinding time is in a range of 3-5 hours.

* * * * *